(12) United States Patent
Pueyo

(10) Patent No.: US 6,206,438 B1
(45) Date of Patent: Mar. 27, 2001

(54) GRILL FOR VEHICLE FRONT END

(75) Inventor: D. Jose Maria Bordes Pueyo, Lliria (ES)

(73) Assignee: Lab. Radio. S.A., Lliria (ES)

( * ) Notice: Subject to any disclaimer, the term of this patent is extended or adjusted under 35 U.S.C. 154(b) by 0 days.

(21) Appl. No.: 09/461,188

(22) Filed: Dec. 15, 1999

(30) Foreign Application Priority Data

Dec. 18, 1998 (ES) ..................................................... 9803180

(51) Int. Cl.[7] .................................................. B60R 19/52
(52) U.S. Cl. ......................... 293/115; 52/660; 52/799.1; 180/68.6
(58) Field of Search ........................ 293/115; 180/68.6; 52/660, 799.1

(56) References Cited

U.S. PATENT DOCUMENTS

| | | |
|---|---|---|
| D. 286,999 | 12/1986 | Hiranaka . |
| D. 405,037 | 2/1999 | Meryman et al. . |
| 1,839,851 * | 1/1932 | Hughes ............................... 180/68.6 |
| 1,841,675 * | 1/1932 | Rood ................................... 180/68.6 |
| 1,862,684 * | 6/1932 | Kellogg ............................... 180/68.6 |
| 1,883,629 * | 10/1932 | Dresser ............................... 180/68.6 |
| 2,032,365 * | 3/1936 | Karmazin ............................. 52/660 |
| 2,312,293 * | 2/1943 | Weiss .................................. 52/660 |
| 2,501,065 | 3/1950 | Longeway . |
| 3,779,325 * | 12/1973 | Liuhanen et al. .................... 180/68.6 |
| 3,936,985 * | 2/1976 | Marulli ................................. 52/660 |
| 4,712,246 | 12/1987 | Morrison . |
| 4,832,150 | 5/1989 | Just et al. . |
| 5,069,009 * | 12/1991 | Suzuki ................................. 52/660 |
| 5,205,597 * | 4/1993 | Chase ................................. 293/115 |
| 5,441,626 * | 8/1995 | Ogisu et al. ........................ 293/115 |
| 5,452,931 * | 9/1995 | Chase ................................. 293/115 |
| 5,478,127 * | 12/1995 | Chase ................................. 293/115 |
| 5,482,336 * | 1/1996 | Rouse et al. ........................ 293/115 |
| 5,487,575 * | 1/1996 | Chase ................................. 293/115 |
| 5,780,125 * | 7/1998 | Takeuchi et al. ................... 293/115 |
| 6,027,150 * | 2/2000 | Flewitt et al. ...................... 293/115 |

FOREIGN PATENT DOCUMENTS

| | | |
|---|---|---|
| 7009036 | 9/1971 | (DE) . |
| 39 16920 A1 | 11/1990 | (DE) . |
| 43 21 969 A1 | 2/1994 | (DE) . |
| 0 231 815 | 1/1987 | (EP) . |
| 0 337 070 | 2/1989 | (EP) . |
| 0 890 487 A2 | 1/1999 | (EP) . |

\* cited by examiner

Primary Examiner—Joseph D. Pape
Assistant Examiner—Kiran Patel
(74) Attorney, Agent, or Firm—Nixon & Vanderhye P.C.

(57) ABSTRACT

A grill for an automobile or other vehicle is provided, and includes a plastic mesh like area designed to visually appear like a metallic wire mesh grill. The grill is substantially less costly than a metallic grill, as it is made of polymer-based plastic material.

11 Claims, 7 Drawing Sheets

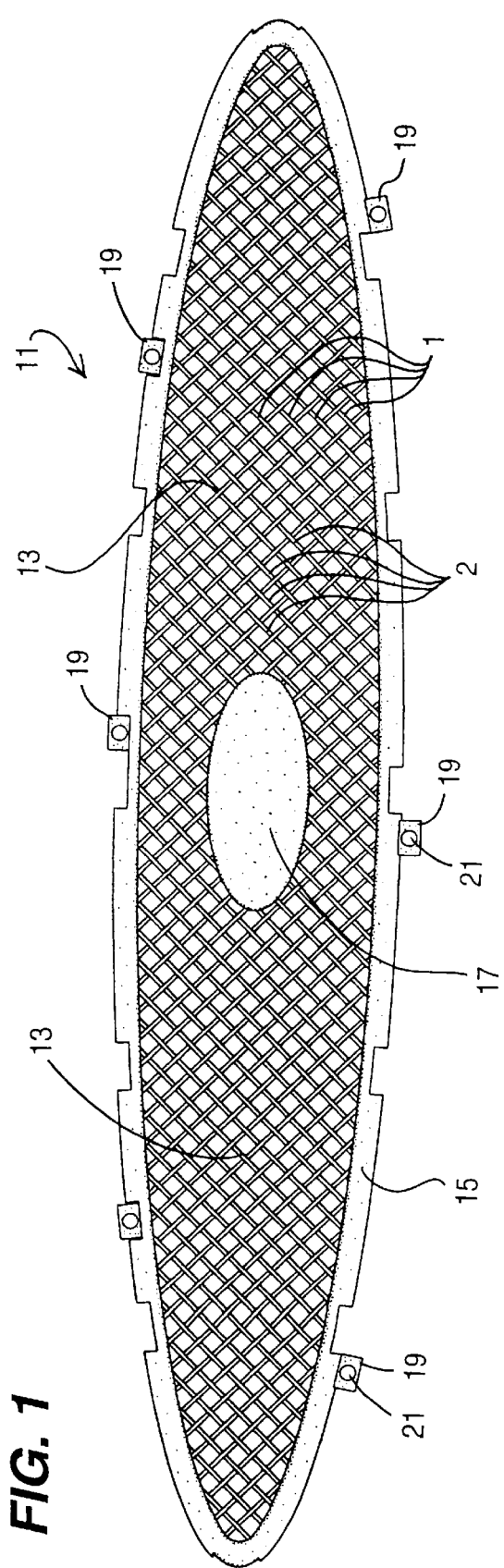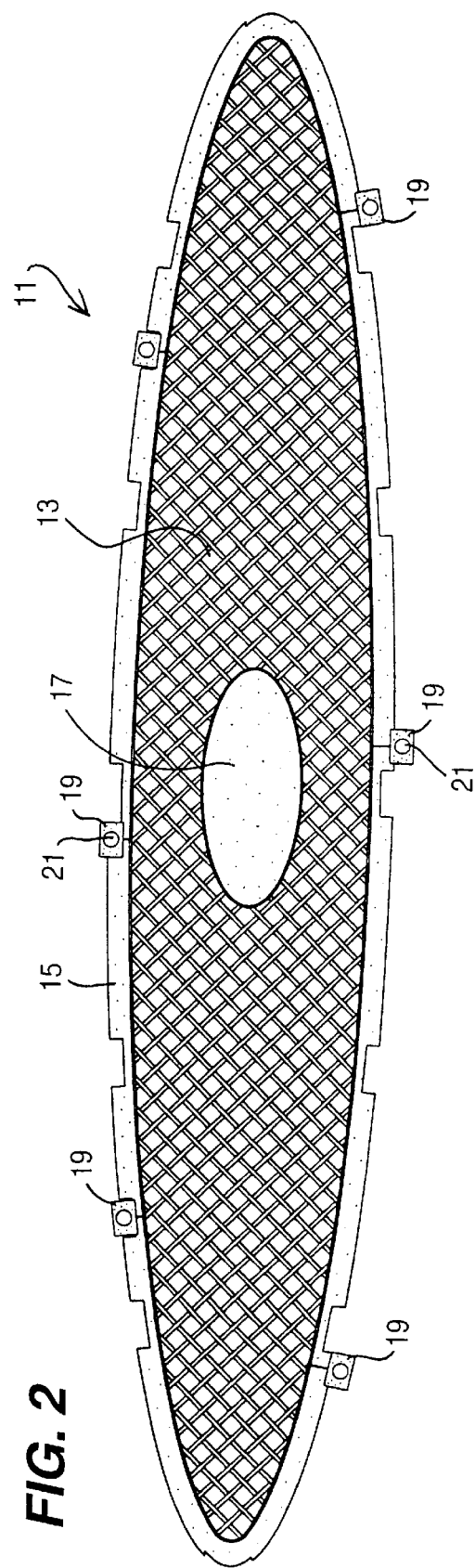
FIG. 1
FIG. 2

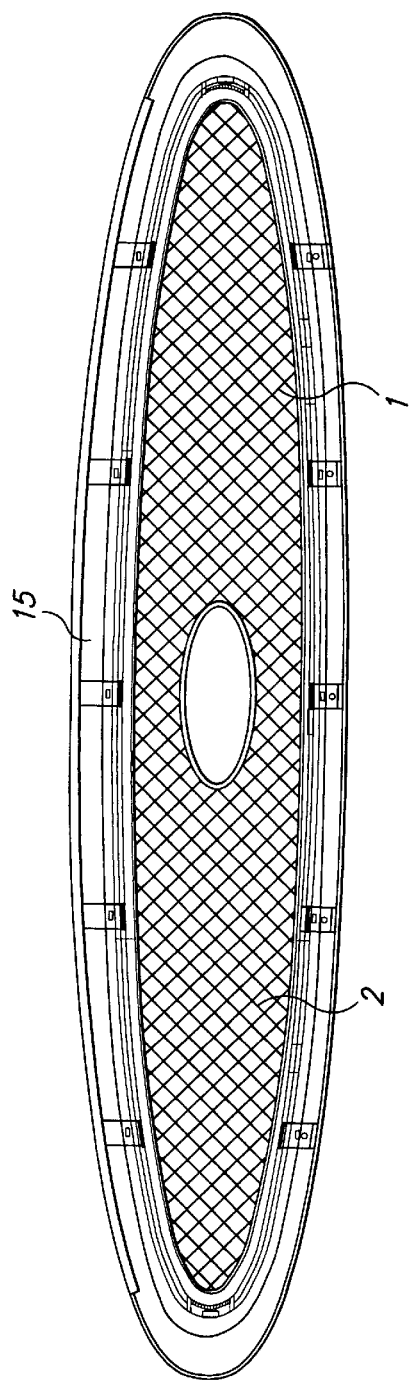
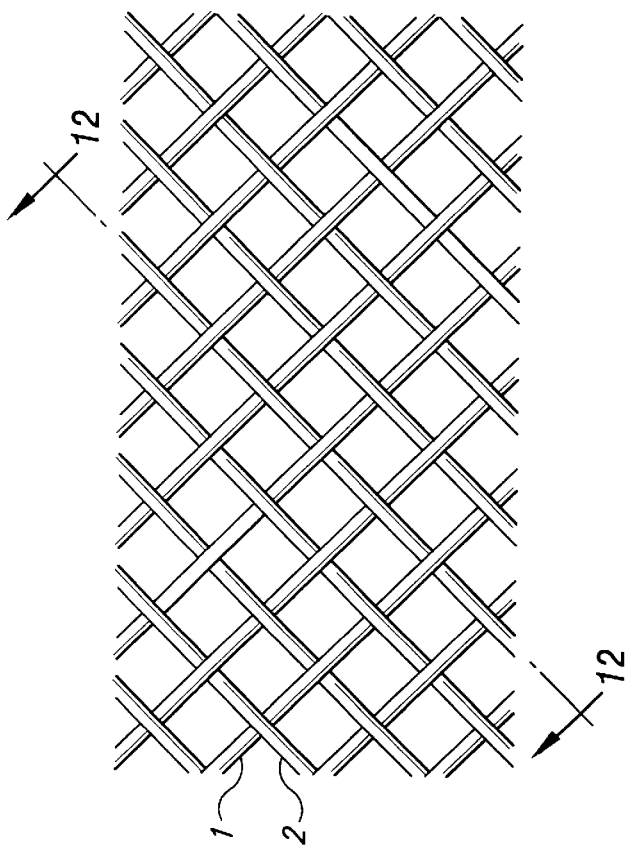

GRILL FOR VEHICLE FRONT END

This application claims priority under 35 U.S.C. Section 119, and any other applicable section, on Application No. 98 03180, filed in Spain (ES) on Dec. 18, 1998.

This invention relates to a grill for use on a front section of a vehicle such as a car, truck, or the like. More particularly, this invention relates to an automotive grill constructed of a polymer based material in a manner such that it aesthetically or visually imitates a wire mesh grill.

BACKGROUND OF THE INVENTION

Different types of grills for vehicle front ends currently exist, including those made from a thin plate incorporating multiple perforations which give the appearance of a grill or mesh manufactured of injected plastic material or another manufacturing system.

Other grills consist of a mesh of woven metallic threads which are joined to a perimetral frame. These metallic mesh grills are aesthetically pleasing from an appearance standpoint, and have long been used to cover the radiator of the corresponding vehicle, allowing air to enter for the cooling thereof, at the same time that metallic mesh creates a pleasing appearance. Unfortunately, metallic mesh automotive grills are costly to manufacture, thereby rendering the final product more expensive than would be otherwise desired.

OBJECTS OF THE INVENTION

The present invention, as is stated in the body of this description, refers to a grill for vehicle front ends designed to be installed in the front part of the corresponding vehicle, directly or otherwise in front of the radiator included in any vehicle. The grill is installed on a frame.

A purpose of the invention is to allow the manufacturing of an injected plastic or polymer-based grill that has the appearance of woven metallic mesh.

Another purpose of the invention is to achieve cost reduction with respect to a woven welded metallic mesh.

A grill in accordance with an embodiment of this invention has a grid structure or appearance that hides the internal areas of the automobile. This grid structure may be made with a thermoplastic injection technique and comprises a set of longitudinal and transversal threads molded in one single piece to provide a form in appearance similar in all aspects to a woven metallic grid or grill.

Generally speaking, this invention fulfills any or all of the above described objects/needs by providing an injection molded automotive grill for vehicle front ends comprising:

a longitudinal set of thread members (1) and a transversal set of thread members (2) which are joined to each other at several intersection points, with the grill being formed by injection molding; and wherein said threads (1 and 2) follow a gently winding path whose joint points or intersections correspond to inflection areas of said threads (1 and 2).

This invention further fulfills any or all of the above described needs in the art by providing a grill for an automotive vehicle comprising:

a plastic mesh section within a perimetric frame, said mesh section comprising a first group of first thread members extending approximately in a first direction and a second group of second thread members extending approximately in a second direction, wherein said first and second directions are approximately perpendicular to one another when viewed from a front of the grill;

wherein intersections between first thread members and second thread members are provided in said mesh section; and wherein at a first group of said intersections an upper surface of the intersection's first thread member is at an elevation below an elevation of an upper surface of the intersection's second thread member, and at a second group of said intersections an upper surface of the intersection's second thread member is at an elevation below an elevation of an upper surface of the intersection's first thread member.

In certain preferred embodiments, the plastic includes a thermoplastic, and the grill is formed by injection molding.

This invention will now be described with respect to certain embodiments thereof, along with reference to the accompanying illustrations.

IN THE DRAWINGS

FIG. 1 is a front plan view of an automotive or vehicle front end grill according to an embodiment of this invention.

FIG. 2 is a rear plan view of the FIG. 1 grill.

FIG. 10 is a front view of the vehicle front-end grill according to another embodiment of this invention. This is comprised of an intertwining of plastic threads, and at the same time is obtained through thermoplastic injection.

FIG. 11 is an enlarged front view of one part of the grill of FIG. 10.

DETAILED DESCRIPTION OF CERTAIN EMBODIMENTS OF THIS INVENTION

Figure 4:
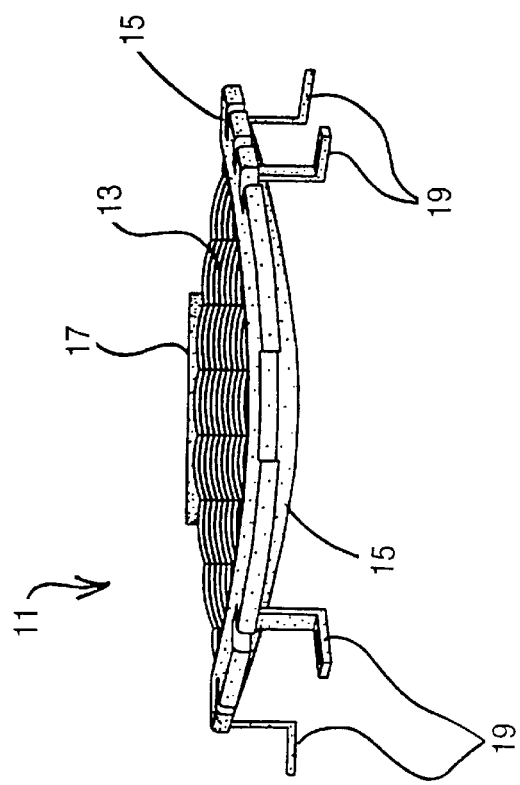
FIG. 4 is an another end elevation view of the grill of FIGS. 1–3, in a position inverted from the FIG. 3 position.
Figure 3:
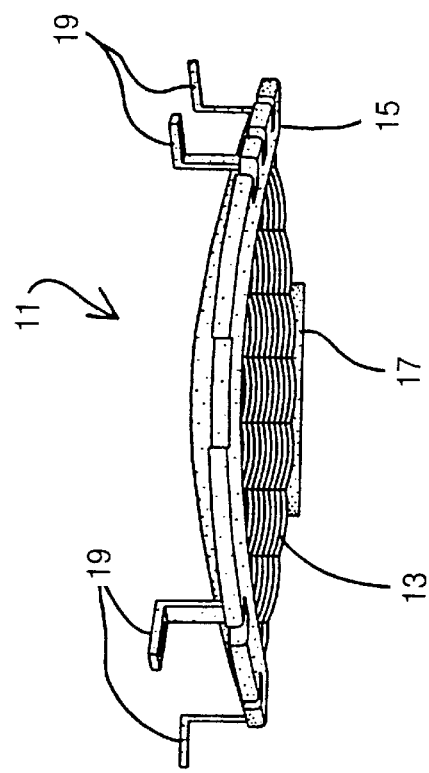
FIG. 3 is an end elevation view of the grill of FIGS. 1–2.
Figure 5:
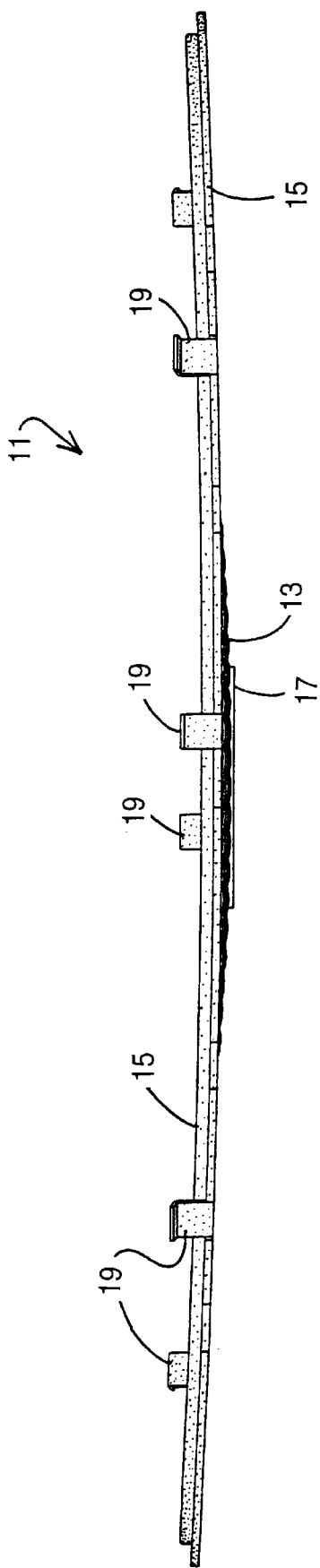
FIG. 5 is a side elevation view of the grill of FIGS. 1–4.
Figure 6:
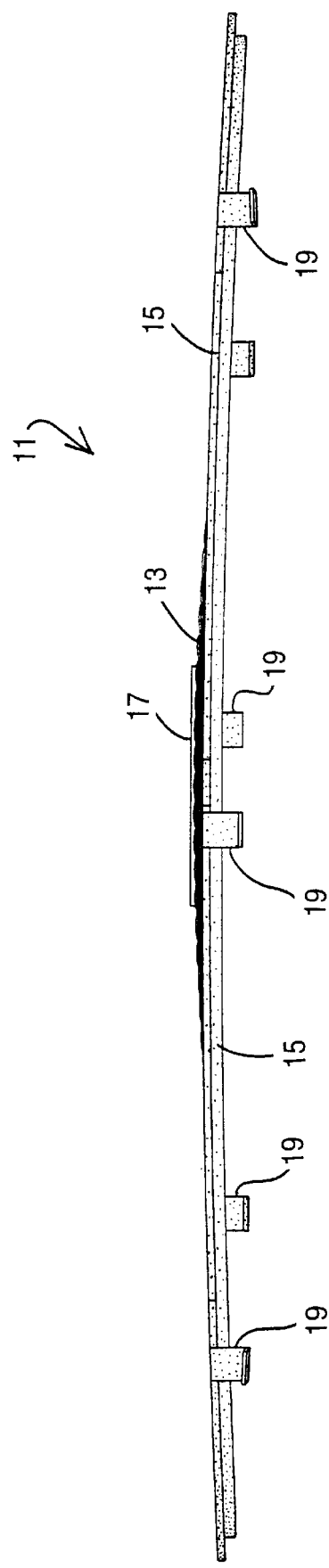
FIG. 6 is another side elevation view of the grill of FIGS. 1–5, in a position inverted from the FIG. 5 position.

Referring now more particularly to the accompanying drawings in which like reference numeral indicate like parts throughout the several views.

The grill for automotive vehicle front ends which is the object of the invention has a grid structure as if it were a conventional grill made up of interwoven threads such as those comprising a metallic mesh.

The new grill, although in principle it has a look similar to a metallic mesh, is advantageously manufactured using a thermoplastic injection machine and therefore said mesh will be made of injection molded thermoplastic material, although it could also be manufactured of any other injectable material, such as aluminum or thermoset polymer-based plastic.

Furthermore, the plastic threads that comprise the grill follow a gently winding path like the threads of a metallic mesh, while at the same time having an advantageous section that permits air to pass through the grill to the radiator and the vehicle's engine, without producing any turbulence or noise as conventionally occurs in some cases.

Additionally, the demolding or grill closing line obtained by injecting the plastic material is located in a hidden area that cannot be seen from the outside.

In order to facilitate a better understanding of this descriptive report and forming an integral part hereof, some figures are presented below in which, in an illustrative and non-limiting fashion, show the purpose of the invention.

Referring to FIGS. 10–13, the vehicle front-end grill includes an intertwining of polymer based plastic threads: longitudinal (1) and transversal (2), both made of plastic material, obtaining the aforementioned grill advantageously by plastic injection. Plastic thread sections 1 and 2 are approximately orthogonal to one another (i.e. perpendicular plus/minus twenty degrees in either direction) when viewed from above or the front as shown in FIGS. 10–11. These threads 1 and 2 follow a gently winding path analogous to a mesh or grid of metallic threads.

Figure 13:
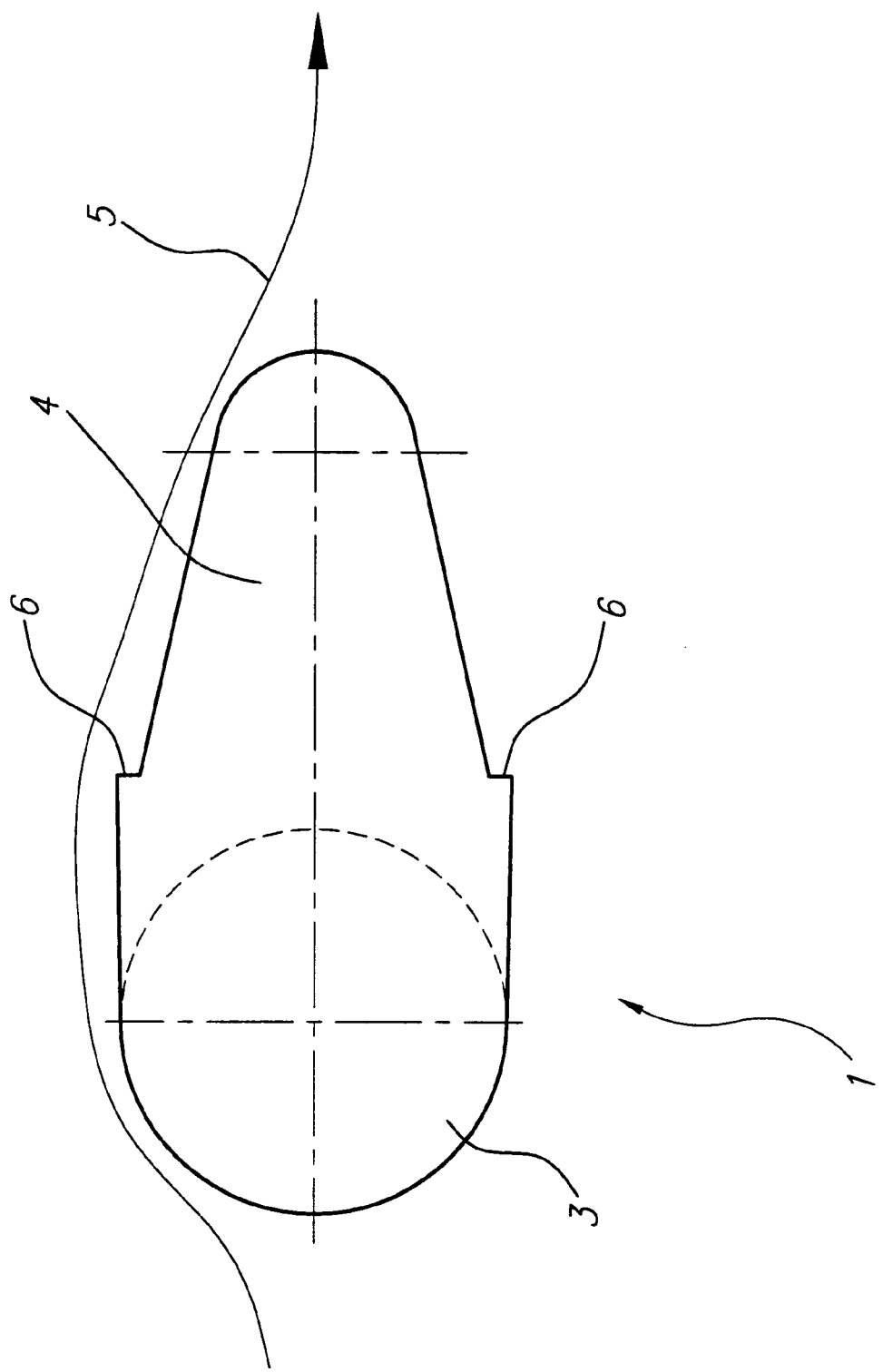
FIG. 13 shows a sectional view of one of the plastic threads that forms art of the vehicle front-end grill of FIGS. 10–12.

Referring to FIG. 13, threads 1 and 2 have an advantageous oval section such that the threads have a wider anterior part (3) and a narrower posterior part (4). This advantageous design facilitates the penetration of air over the grill, such that when the air collides with the anterior part (3) of the grill's threads, the aerodynamic line of attack will be continuous without its path being interrupted because no turbulence will be produced. Therefore, the path or amount/volume of air that reaches the engine and the radiator behind the grill will be raised, arriving with a great force of penetration which is very advantageous for the cooling of said engine and for the fluid that circulates inside the aforementioned radiator. The section of threads 1 and 2 of the grill of the invention has a clearly aerodynamic geometry.

Furthermore, each one of threads 1 and 2 of the grill has small lateral steps (6) to compensate for possible misalignments of said threads. In any case, these small steps (6) do not interrupt the aerodynamic line of attack (5) according to certain embodiments of this invention.

Figure 12:
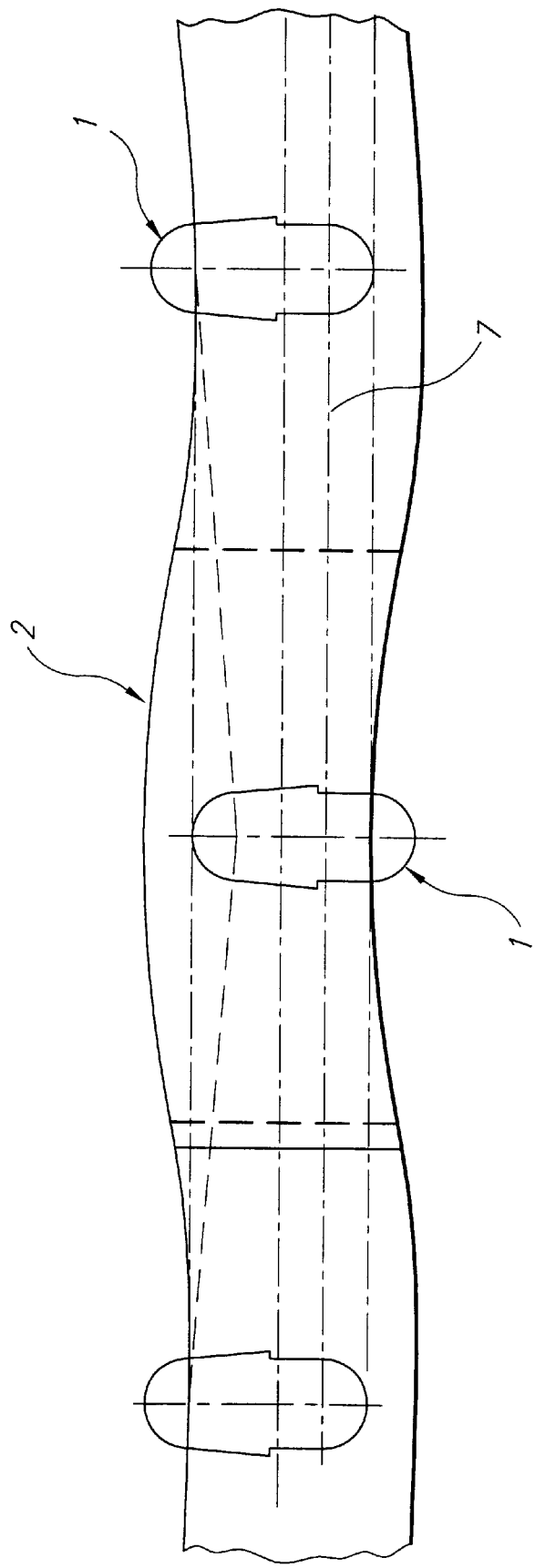
FIG. 12 is a detailed view of the grill of FIGS. 10–11 where the join of the grill's thread components is shown in detail.

The soft demolding or closing line (7), as shown in FIG. 12, is located in the most hidden place possible, corresponding to the posterior part (4) of threads 1 and 2 of the grill, with said demolding line (7) being covered by the small lateral steps (6). Naturally, the soft demolding line (7) also does not interrupt the aerodynamic line of attack (5) of the air.

The structure and joining of threads 1 and 2 of the grill provide it with great resistance and rigidity. As is evident, the demolding lines (7) are contained on the mold's closing surface.

FIGS. 1–9 illustrate an automotive grill in accordance with another embodiment of this invention. As illustrated, automotive front grill 11 includes a mesh of injection molded thermoplastic thread members 1 and 2 that extend in approximately orthogonal directions so as to appear as if the grill includes criss-crossing wires. The mesh section 13 of thread members 1 and 2 is provided within perimetric frame 15 which provides support for the thread members. At a central location of the mesh section 13, a decal area or section 17 absent thread members may be provided. For example, an automotive company (e.g. "Ford") may place its name or trademark in area 17 for advertising or aesthetic purposes. Moreover, approximately flat section 17 provides further support for the relatively thin thread members 1 and 2. Attachment members 19 (each preferably including an aperture 21 therein for receiving a fastener such as a screw or bolt) project or extend at approximately ninety degree angles (e.g. ninety degrees plus/minus 15 degrees in either direction) from frame 15. In attaching the grill to a vehicle, fasteners are inserted through apertures 21 and into a receiving portion of the vehicle in order to fasten the grill to the vehicle.

Figure 7:
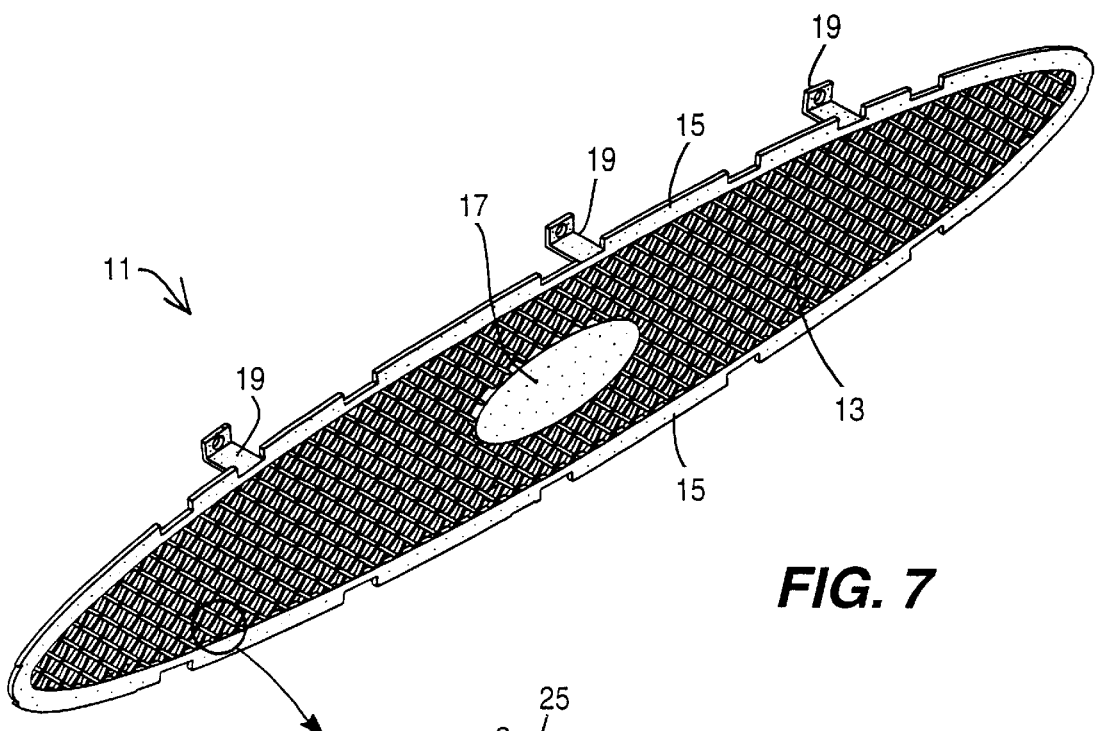
FIG. 7 is a perspective view of the grill of FIGS. 1–6.
Figure 8:
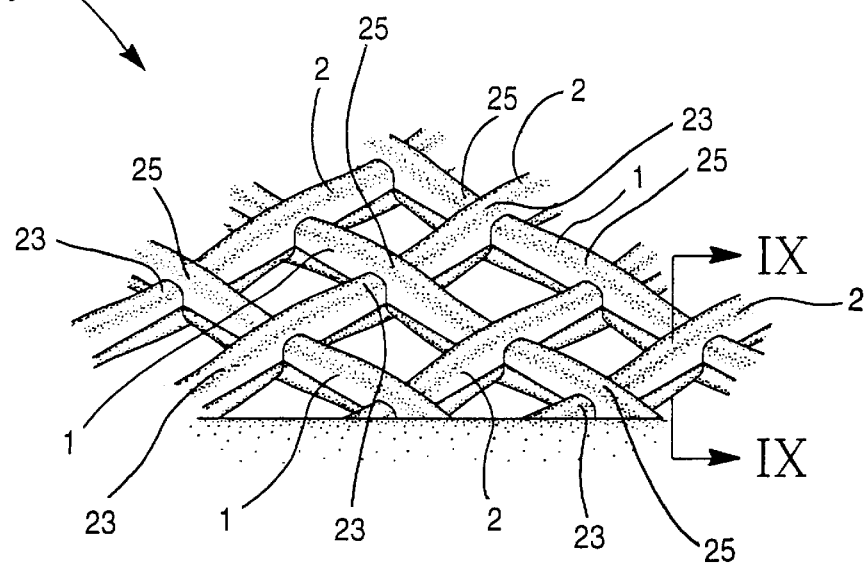
FIG. 8 is an enlarged perspective view of a portion of the FIG. 1–7 grill circled in FIG. 7.
Figure 9:
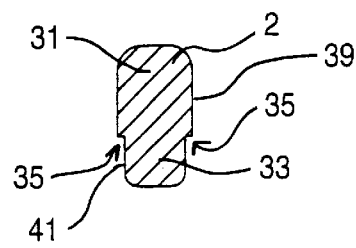
FIG. 9 is a side cross sectional view of one of the plastic threads of the grill of FIG. 8, taken along section line IX—IX.

Referring to FIGS. 7–9, it can be seen that mesh-like portion 13 of the grill includes thread members 1 and 2 (which are formed together preferably via injection molding, of thermoplastic material) which visually simulate criss-crossing wire mesh. As can be seen (e.g. see FIG. 8), each of members 1 and 2 are formed so as to gently wind/slope up and down as at an approximately constant frequency as they extend in a generally longitudinal direction (i.e. similar to rolling hills in a countryside environment). By "approximately constant frequency", we mean that members 1 and 2 alternately wind up and down (e.g. see FIGS. 8 and 12) where the upward sloping portions are of approximately the same distance or length as the downward sloping portions.

As illustrated in FIG. 8, intersections of thread members 1 and 2 occur at an apex or high point of one member (e.g. thread member 1) and a bottom or low point of the orthogonal member (e.g. thread member 2). Thus, at an intersection of a high point of member 1 and a bottom point of member 2 (see FIG. 8), an upper surface 23 of member 2 is at an elevation lower than the elevation of upper surface 25 of member 1. In a similar manner, at an intersection of a high point of thread member 2 and a low point of thread member 1, an upper surface 25 of member 1 is at an elevation lower than the elevation of upper surface 23 of member 2. Because of these differences in elevation between upper surfaces of members 1 and 2 at intersection points in the mesh area 13, the grill has a visual appearance to a view similar to that of an interwoven metal wire grill where the metal wires are woven in and out so as to criss-cross one another.

As shown in FIG. 9, when viewed in cross section, a thread member (1 or 2) may have an upper generally oval portion 31 that is larger than its lower generally oval portion 33 in certain embodiments of this invention. In other words, the thread members in cross section may include wider anterior portion 31 and a narrower posterior portion 33. As shown in FIG. 9, the thread member in cross section is generally or approximately oval in shape. In the FIG. 9 embodiment, the upper and lower portions 31 and 33, respectively, are separated by steps or drop-offs 35. As with the previous embodiment, steps 35 compensate for possible misalignments of the thread members 1 and 2, and preferably do not substantially interrupt the aerodynamic line of attack of air flowing through the mesh portion of the grill according to certain embodiments of this invention. While FIG. 9 illustrates steps 35 as extending in a perpendicular direction relative to the respective outer surfaces of portions 31 and 33, this need not be the case as steps 35 may instead be angles from about 20 to 95 degrees inwardly from the outer surface 39 of portion 31, or these same angular amounts from the outer surface 41 of member 33 (FIG. 9 shows steps 35 defining an angle of 90 degrees with surface 39). In still other embodiments of this invention, cross sections of thread members 1 and 2 need not have steps as they may instead be approximately oval, rectangular, square, circular, or triangular in shape.

Once given the above disclosure, many other features, modifications, and improvements will become apparent to the skilled artisan. Such other features, modifications, and improvements are, therefore, considered to be a part of this invention, the scope of which is to be determined by the following claims.

I claim:

1. An injection molded automotive grill for vehicle front ends comprising:

a longitudinal set of first thread members and a transversal set of second thread members which are joined to each other at several intersection points, with the grill being formed by injection molding; and wherein each of said threads follows a gently winding path so that said intersection points correspond to inflection areas of said threads, and wherein at a first group of said intersection points an upper surface of the first thread member is at an elevation below an elevation of an upper surface of the second thread member, and at a second group of said intersection points an upper surface of the second thread member is at an elevation below an elevation of an upper surface of the first thread member.

2. The grill of claim 1, wherein the thread members are at least partially oval in cross section in order to facilitate the penetration of the grill by air and to prevent an aerodynamic line of attack (5) directed toward a vehicle radiator or engine from being interrupted.

3. The grill of claim 1, wherein each thread member in cross section includes a wider anterior part (3) and a narrower posterior part (4).

4. The grill of claim 3, wherein each thread member includes a lateral step to compensate for molding misalignments.

5. The grill of claim 3, further comprising a demolding line on one of said thread members being located at least partially on the posterior part of the thread, with said demolding line being at least partially hidden from view behind a step regarding a viewer viewing the grill from the front thereof as if the grill were installed on a vehicle.

6. A grill for an automotive vehicle comprising:

a plastic mesh section within a perimetric frame, said mesh section comprising a first group of first thread members extending approximately in a first direction and a second group of second thread members extending approximately in a second direction, wherein said first and second directions are approximately perpendicular to one another when viewed from a front of the grill;

wherein intersections between first thread members and second thread members are provided in said mesh section; and wherein at a first group of said intersections an upper surface of the intersection's first thread member is at an elevation below an elevation of an upper surface of the intersection's second thread member, and at a second group of said intersections an upper surface of the intersection's second thread member is at an elevation below an elevation of an upper surface of the intersection's first thread member.

7. The grill of claim 6, wherein said plastic includes a thermoplastic, and said grill is formed by injection molding such that said first and second groups of thread members are integrally molded with one another.

8. The grill of claim 6, wherein said intersections are provided so that the grill visually resembles a woven wire mesh grill.

9. The grill of claim 6, wherein each of said thread members includes a step defined therein when viewed in cross section.

10. The grill of claim 6, wherein a plurality of said thread members each include a wider anterior portion and a narrower posterior portion.

11. The grill of claim 6, wherein at said first group of said intersections the upper surface of the intersection's first thread member is at an elevation below the elevation of the upper surface of the intersection's second thread member and the lower surface of the intersection's first thread member is at an elevation below the elevation of the lower surface of the intersection's second thread member; and wherein at the second group of said intersections the upper surface of the intersection's second thread member is at an elevation below an elevation of the upper surface of the intersection's first thread member, and the lower surface of the intersection's second thread member is at an elevation below an elevation of the lower surface of the intersection's first thread member; and wherein the first and second thread members are integrally molded and formed with one another at each of said intersections.

\* \* \* \* \*